(12) United States Patent
Ramanathan et al.

(10) Patent No.: US 8,495,727 B2
(45) Date of Patent: Jul. 23, 2013

(54) SPAM REDUCTION IN REAL TIME COMMUNICATIONS BY HUMAN INTERACTION PROOF

(75) Inventors: Rajesh Ramanathan, Redmond, WA (US); Amritansh Raghav, Seattle, WA (US); Craig M. Combel, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1305 days.

(21) Appl. No.: 11/834,883

(22) Filed: Aug. 7, 2007

(65) Prior Publication Data
US 2009/0044264 A1 Feb. 12, 2009

(51) Int. Cl.
*H04L 29/06* (2006.01)

(52) U.S. Cl.
USPC ........ 726/14; 726/2; 726/5; 726/22; 709/207; 709/229; 713/186

(58) Field of Classification Search
USPC ...................................................... 726/2, 14
See application file for complete search history.

(56) References Cited

U.S. PATENT DOCUMENTS

| | | | |
|---|---|---|---|
| 7,139,916 B2 | 11/2006 | Billingsley et al. | |
| 7,200,576 B2 | 4/2007 | Steeves et al. | |
| 7,680,891 B1 * | 3/2010 | Pongsajapan | 709/206 |
| 7,841,940 B2 * | 11/2010 | Bronstein | 463/29 |
| 8,019,127 B2 * | 9/2011 | Misra | 382/115 |
| 8,056,129 B2 * | 11/2011 | Gusler et al. | 726/22 |
| 2004/0199597 A1 * | 10/2004 | Libbey et al. | 709/207 |
| 2004/0254793 A1 | 12/2004 | Herley et al. | |
| 2005/0021649 A1 | 1/2005 | Goodman et al. | |
| 2005/0065802 A1 | 3/2005 | Rui et al. | |
| 2005/0120201 A1 | 6/2005 | Benaloh et al. | |
| 2006/0095578 A1 | 5/2006 | Paya et al. | |
| 2007/0039040 A1 | 2/2007 | McRae et al. | |
| 2007/0101010 A1 | 5/2007 | Ellison et al. | |
| 2007/0179905 A1 * | 8/2007 | Buch et al. | 705/75 |

FOREIGN PATENT DOCUMENTS

CN  1573783 A  2/2005

OTHER PUBLICATIONS

Truong, Huy D., Christopher F. Turner, and Cliff C. Zou. "iCAPTCHA: The next Generation of CAPTCHA Designed to Defend Against $3^{rd}$ Party Human Attacks." IEEE International Conference on Communications (ICC) [2011]: pp. 1-6.*

Rachna Dhamija et al. "Phish and HIPS: Human Interactive Proofs to Detect Phishing Attacks." In: Human Interactive Proofs, Second International Workshop on Human Interactive Proofs (HIP 2005). Edited by H.S. Baird and D.P. Lopresti. Springer, May 2005, pp. 127-141.

International Search Report for PCT Patent Application No. PCT/US2008/072259 dated May 28, 2009, 11 pages.

(Continued)

*Primary Examiner* — Taghi Arani
*Assistant Examiner* — Narciso Victoria

(57) ABSTRACT

The claimed subject matter provides a system and/or a method that facilitates authenticating a data communication. An interface component can receive data related to a real time data communication between two or more clients. A verification component can employ a human interaction proof (HIP) to a client participating within the real time data communication, wherein a human identity of the client is authenticated as a function of a response to the HIP.

20 Claims, 10 Drawing Sheets

OTHER PUBLICATIONS

"Document Processing and Understanding" http://research.microsoft.com/~kumarc last viewed May 7, 2007, 2 pages.

"Stop Spam Bots with the HTML Encoded Captcha (HEC)" http://www.omgili.com/captcha.php last viewed May 7, 2007, 1 page.

Chellapilla, et al. "Computers Beat Humans at Single Character Recognition in Reading Based Human Interaction Proof (HIPs)" (2005) MIT Press pp. 256-272.

"European Search Report", Mailed Date: Oct. 6, 2010, Application No. EP/08/79/7224, Filed Date: Sep. 27, 2010, pp. 7. (MS# 320340.05).

Office Action from the Patent Office of the Russian Federation regarding Application No. 2010103966 dated May 16, 2012.

Office Action from the State Intellectual Property Office of the People's Republic of China regarding Application No. 2008801020611 dated Feb. 13, 2012.

CN OA dated Mar. 25, 2011 for Chinese Application No. 200880102061.1, 11 pages.

Office Action from the State Intellectual Property Office of the People's Republic of China regarding Application No. 200880102061.1 dated Nov. 5, 2012.

Office Action from the European Patent Office regarding Application No. 08797224.6 dated Sep. 13, 2012.

Summons to Attend Oral Proceedings Pursuant to Rule 115(1) EPC from the European Patent Office regarding Application No. 08797224.6 dated Apr. 16, 2013.

\* cited by examiner

CRAIG COMBEL- CONVERSATION

● Rajesh Ramanathan
○ Craig Combel

Please verify your identify by typing the characters below:

⟨2NX3 59A

|

SEND

← 500

4 Participant Conference

● Rajesh Ramanathan- Leader
○ Craig Combel
○ Amritansh Raghav
○ Travis Hafner

Rajesh Ramanathan [3:15 PM]:
> Hello, welcome to the conference!

Cannot invite Craig Combel to join this conference. Verification of Craig's human identity failed. A bot or an automated attendant answered.

|

SEND

SPAM REDUCTION IN REAL TIME COMMUNICATIONS BY HUMAN INTERACTION PROOF

BACKGROUND

The Internet has spawned many new communications mediums that continue to become increasingly popular and wide spread. The ever-growing popularity of mobile devices such as internet-capable smartphones, personal digital assistants (PDAs) and the like have contributed to this continued popularity. These new communication mediums include but are not limited to electronic mail (email), voice-over-Internet-Protocol (VoIP), instant messaging (IM) and text messaging over a network of two or more computers or network connectable, processor-based devices. For example, email allows electronic communication of a text message alone or in combination with graphics and optional attachments. Text or instant messaging is a simpler communication mechanism for transmitting short text messages. These electronic communication mediums are popular as they provide inexpensive, easy, point-to-point communication that is less intrusive than a traditional phone call. There is an abundance of other benefits, for example, email easily enables one-to-many communication, there is no need to synchronize participants and the content can be planned easier, among other things. Unfortunately, these mediums have numerous main adversaries that threaten the convenience of and confidence in their use, namely spam, phishing techniques, and viruses.

The problem of spam and phishing is rampant in the email and web world which has led to several insufficient solutions. In light of such, a variety of systems and techniques have been developed and employed to combat spam, phishing techniques, and malicious code related to electronic communication media. With the advent of voice enabled web and unified communications, more and more organizations are employing voice over Internet protocol (VoIP) and instant messaging federation. Within such environments, problems associated with email will start manifesting toward the real time communication sector in a similar form such as spam called generated by applications known as "bots," real time applications, automated programs, or users in public Internet clouds starting a phishing attack to retrieve sensitive information from unsuspecting users. Thus, conventional techniques (e.g., content-based filters, IP address-based filters, etc.) are becoming ineffective within the unified communication realm and/or real time communication sector in recognizing and blocking disguised spam, phishing attacks, bots, automated programs, real time applications and the like in relation to electronic communications. The integrity of enterprises and data communications is imperative to success in which improvements are necessary to ensure security and/or protective techniques are less vulnerable, stronger, and more difficult to penetrate.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate securing and authenticating real time communications. A verification component can utilize a human interaction proof (HIP) within a real time data communication in order to authenticate human identity for a client associated therewith. The HIP can be employed with any real time data communication such as an instant messaging communication, a voice communication, an audio communication, a voice over Internet protocol (VoIP) communication, a file sharing communication, a desktop sharing communication, or a conference communication. The verification component can ensure secure data communications by utilizing the HIP prior to initiating a real time data communication and/or during the real time data communication.

The verification component can implement a detection component that can dynamically monitor a real time data communication for characteristics associated with a bot, a phishing attack, an automated program, a real time application, an agent in a cloud, a portion of spam, and the like. The detection component can identify suspicious activity and/or behavior in which the verification can utilize the HIP to ensure the real time data communication integrity is not jeopardized. In addition, a HIP generator can provide the creation and/or selection of a human interaction proof (HIP) to employ within the real time data communication. Such HIP can be selected and/or created based at least in part upon the type of data communication and/or the client involved therewith. The verification component can further utilize a performance component that can implement at least one action based upon a response that correlates with the HIP. For example, the action can be a warning, a block, a suspension, a continuation of the communication, a termination, etc. In other aspects of the claimed subject matter, methods are provided that facilitate employing a human interaction proof (HIP) to authenticate a data communication associated with real time communications.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

FIG. 5 illustrates a block diagram of an exemplary user interface that facilitates implementing a human interaction proof in connection with a real time data communication for identity authentication.

DETAILED DESCRIPTION

Figure 1:
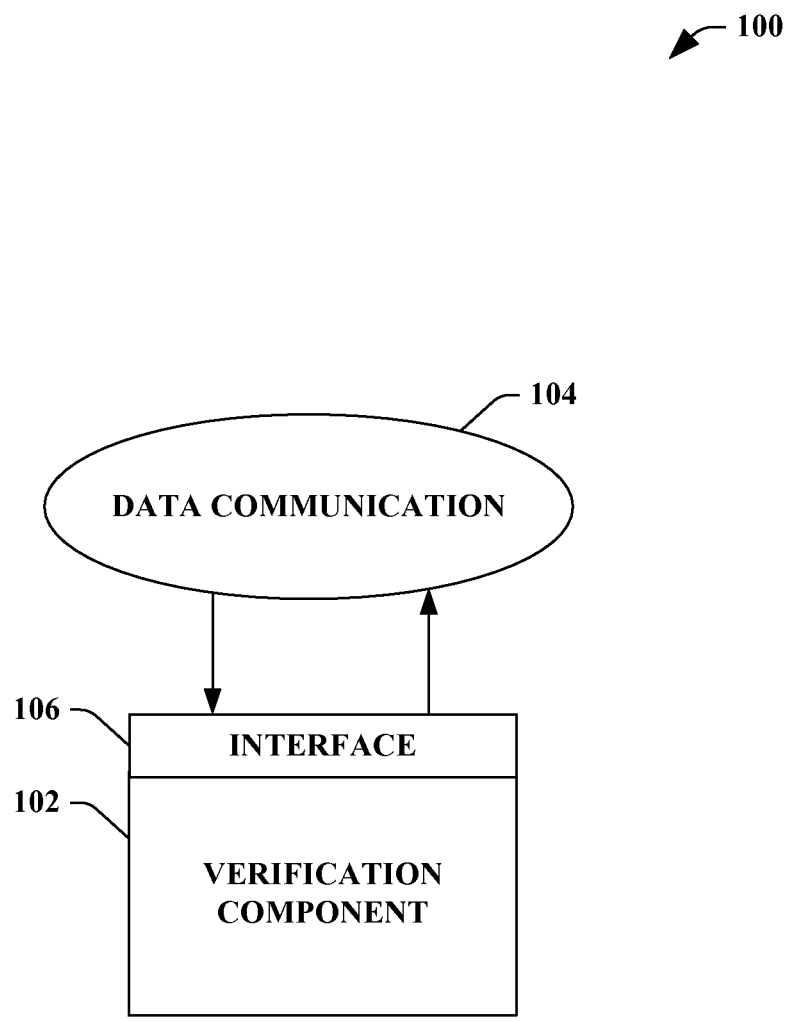
FIG. 1 illustrates a block diagram of an exemplary system that facilitates securing and authenticating real time communications.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "generator," "store," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates securing and authenticating real time communications. The system 100 can include a verification component 102 that can implement a human interaction proof (HIP) to a data communication 104 in order to ensure integrity and authenticate at least one client associated with the data communication 104. In general, the system 100 can enable the employment of a human interaction proof (HIP) to a data communication 104 for identity authentication in which the data communication 104 can be a real time data communication such as, but not limited to, an instant messaging communication, a voice communication, an audio communication, a voice over Internet protocol (VoIP) communication, file sharing communication, desktop sharing communication, conference communication, and the like. In particular, the verification component 102 can communicate a human interaction proof (HIP) to a client via an interface component 106 (discussed below), wherein such client can be identified as reliable or threatening. A response to the HIP can be evaluated by the verification component 102 in order to ascertain the response correlates to a reliable response (e.g., a human, a user, a trusted client, etc.) or a threatening response (e.g., a bot, an automated response, a real time application, an automated program, etc.). Thus, the verification component 102 can identify a client within the data communication 104 as a potential security threat such as a bot (e.g., a program that operates as an agent for a user or another program), an automated response, a real time application, or an automated program that can be considered spam and/or a phishing attack.

For example, a real time data communication such as an instant messaging communication can include at least two or more clients. In order to verify the identity of a client within the instant messaging communication, the verification component 102 can initiate a HIP to the client. Based on the response of the client, the HIP can verify whether or not the client is an actual user/human or an automated program (e.g., bot, automated application, real time application, etc.). For instance, the HIP can be a sequence of ASCI characters to which the client must correctly match and/or enter. It is to be appreciated that the HIP can be any suitable human interaction proof such as an image, a portion of characters, a portion of audio data, a portion of voice data, a portion of video data, etc. Moreover, the HIP can be provided to the client at any suitable time to the real time data communication such as, but not limited to, at initiation of the real time data communication, prior to the real time data communication, during the real time data communication, after the real time data communication, etc.

Generally, real time applications or "bots" can impersonate a user by creating an instant message or reply to an instant message on behalf of a user. Such bots can be malicious (e.g., a server running in the sky, etc.) or they can be configured by users to serve specific legitimate purpose (e.g., reply to an instant message when a user is unavailable, etc.). Yet, the system 100 can provide a mechanism with the HIP to verify that the other end is a human being and not a machine or a bot in order to handle the data communication appropriately. As will be understood, a HIP can refer to protocols in which one party presents a question or 'challenge' and another party must provide a valid answer or 'response' in order to be authenticated. In accordance with system 100, the verification component 102 can generate a HIP 'challenge' in which a response can be received in order to validate and authorize the data communication 104.

Furthermore, the system 100 can verify client identity within a data communication after the initiation of the communication. For example, even after the human identity has been verified when initiating the communication, a bot can insert themselves in an existing conversation/communication which can enable the bot to continue a conversation as the user. However, the system 100 can implement a HIP during a conversation/communication in order to thwart such attempts of bot insertion. It is to be appreciated that the verification component 102 can employ the HIP to the data communication 104 automatically, manually, and/or any combination thereof.

The verification component 102 can further identify phishing uniform resource locators (URLs) that take advantage of a domain name. For example, a malicious user can appear as a genuine voice and/or instant message user by using a phishing URL. The verification component 102 can utilize a HIP to detect such phishing attack and warn of such activity. For instance, if the verification component 102 can detect such a URL, the user can be warned prior to launching into such a conversation and/or communication.

In another example, the verification component 102 can be utilized in various conferencing scenarios (e.g., communication involving two or more parties such as a voice or an instant messaging conferencing). In particular, the verification component 102 can provide dynamic monitoring of data communications in order to identify potential threats. For instance, a participant may join the data communication 104 and be silent (e.g., no data communication via voice, text, audio, video, etc.). In such example, the verification component 102 can ascertain such silence as a trigger to initiate a HIP to verify such participant.

In still another example, the verification component 102 can be employed in multi-modal communications. As discussed, the verification component 102 can implement a HIP for the data communication 104. Additionally, the verification component 102 can authenticate various data communications impendent of such formats and/or modes. For example, an instant messaging, audio, video, text, etc. can be occurring within a communication session and the verification component 102 can allow the HIP verification for a data communication mode and/or format authenticate a disparate data communication mode and/or format. Thus, if an IM data communication has been authenticated with a HIP employed by the verification component 102, then the audio data communication associated with such communication session can be authenticated based at least in part upon the IM data communication authentication.

In addition, the system 100 can include any suitable and/or necessary interface component 106 (herein referred to as "interface 106"), which provides various adapters, connectors, channels, communication paths, etc. to integrate the verification component 102 into virtually any operating and/or database system(s) and/or with one another. In addition, the interface component 106 can provide various adapters, connectors, channels, communication paths, etc., that provide for interaction with the verification component 102, the data communication 104, and any other device and/or component associated with the system 100.

Figure 2:
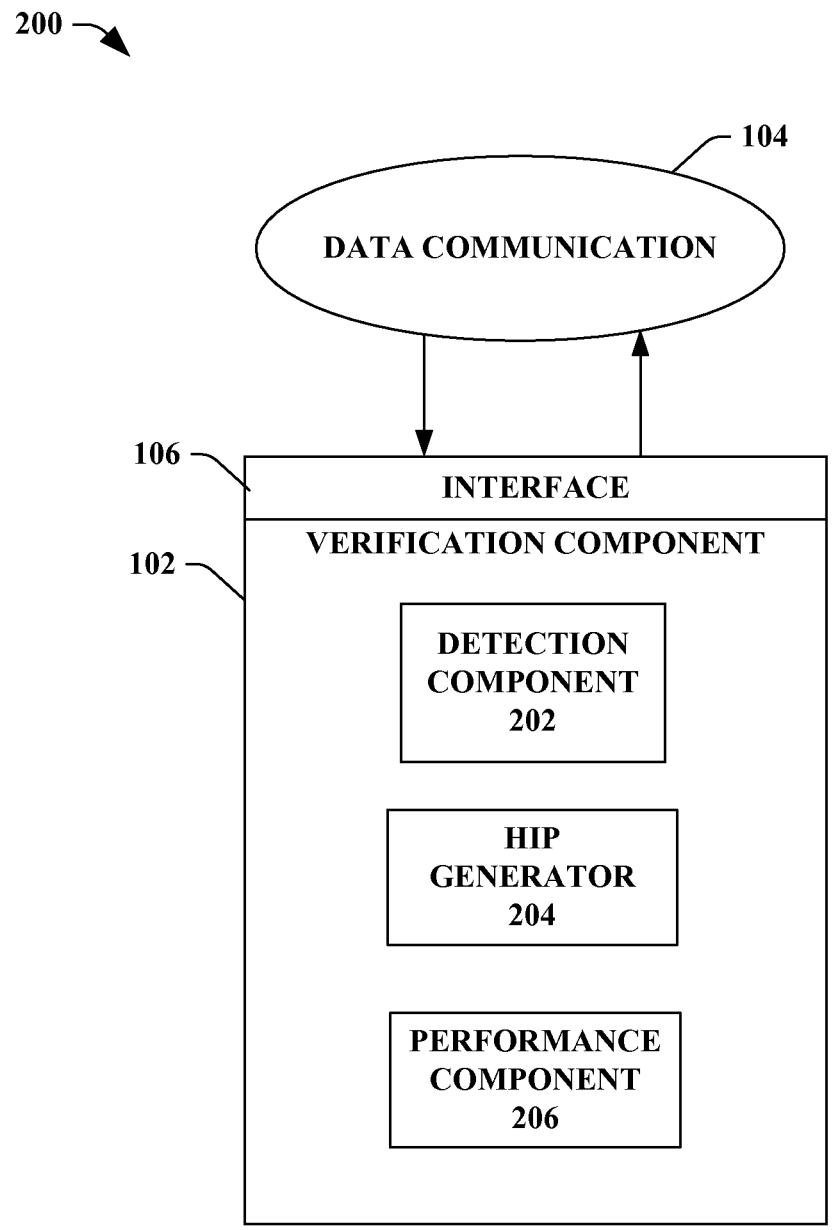
FIG. 2 illustrates a block diagram of an exemplary system that facilitates employing a human interaction proof (HIP) to authenticate a data communication associated with real time communications.

FIG. 2 illustrates a system 200 that facilitates employing a human interaction proof (HIP) to authenticate a data communication associated with real time communications. The system 200 can utilize the verification component 102 to authenticate data communications by evaluating responses to a human interaction proof (HIP). The verification component 102 can enhance security associated with real time data communications by enforcing the implementation of a human interaction proof (HIP) and evaluating a response to such HIP. Generally, the HIP can be provided to a client associated with the data communication 104, wherein such client can respond in a manner that enables identification of at least one of a bot, a phishing attack, a malicious user, spam, an automated program, a real time application, or a communication associated with a security violation.

For example, a bot can be inserted into a group data communication such as an instant messaging session and/or a conference session. With such insertion, the bot can record the existing conversation and/or otherwise send a response that is inappropriate and/or incorrect to the conference and/or instant messaging session participants. In such example, the conference leader setting up a conference can utilize the verification component 102 to specify the exclusion of bots and/or otherwise require to be notified that an unsafe participant has been added. Thus, the verification component 102 can utilize a HIP to the participants of the conference and/or instant messaging session in order to thwart such bots and/or phishing attacks.

Moreover, the system 200 can further provide identity authentication during file transfers and/or data sharing. A file transfer can be a sensitive data communication since such transfers can include internal and secretive information. The verification component 102 can verify whether a remote user is a human or a bot prior to initiating the file transfer session, wherein such verification can provide an assurance to users and administrations that such data shall not be passed to malicious third-parties (e.g., bots, automated programs, real time applications, automated agents in a cloud, etc.).

The verification component 102 can utilize a detection component 202 that can enable real time monitoring of the data communication 104 and respective clients. Thus, the detection component 202 can provide in situ monitoring in order to continuously identify a potential spam, bot, automated program, automated application, real time application, phishing attack, etc. For example, the detection component 202 can monitor the client response to the HIP, the data communication 104, a response within the data communication 104, an incoming data communication, an outgoing data communication, a conference data communication, a file sharing data communication, a desktop data communication, a URL related to a data communication, a voice signature, an audio signature, a HIP response, and/or any other suitable data associated with a real time data communication. The detection component 202 can continuously monitor the data communication 104 in order to identify a potential threat (e.g., a bot, a phishing attack, an automated program, etc.) by comparing the data communication and/or client communications with previous and/or historic data. Thus, characteristics and/or data related to a particular data communication and client can be utilized to identify malicious data communications which are not authentic. The detection component 202 can detect a bot or a phishing conversation by using pattern matching heuristics based on previous conversations that are observer and forewarns the user (e.g., or the conference leader) about the potential security issues with the particular participant and/or client. In addition, the conference leader in this scenario can receive a warning that one of the participants could be a bot or a malicious user.

In an example, the detection component 202 can evaluate a conference data communication with respective clients. The verification component 102 can employ a HIP to a portion of the conference participants, wherein the detection component 202 can evaluate such responses to the HIP and/or further continuously monitor the conference data communication to identify suspicious and/or malicious behavior related to at least one of spam, bot, automated program, automated application, real time application, phishing attack, etc. For instance, upon verification of at least a portion of the conference participants, the detection component 202 can identify a characteristic that suspects unauthenticated participants to which the verification component 102 can re-initiate the HIP for identity authentication. Moreover, it is to be appreciated that the detection component 202 can continuously monitor a file sharing and/or desktop sharing data communication.

The verification component 102 can further utilize a human interaction proof (HIP) generator 204 that can create and/or select a HIP to be employed for identity authentication within the data communication 104. The HIP generator 204 can employ an interactive computing technique in order to establish identity of a user (or user device). For instance, the HIP generator 204 create a challenge by which a sender will have to respond with human input in order to gain access through the data communication 104. Furthermore, the HIP generator 204 can create and/or select a HIP and/or challenge based at least in part upon evaluating the particular data communication 104. Thus, the HIP generator can create and/or select a HIP and/or challenge for instant messaging, whereas a disparate HIP can be created and/or selected for voice communications. It is to be appreciated that the HIP generator 204 can create and/or select a challenge and/or HIP based upon the data communication, the data communication type, the data communication format, the data communication participants, a client associated with the data communication, and/or historic data related to the data communication or the client.

It is to be understood and appreciated that the HIP can be a distorted series or string of alpha, numeric or alpha-numeric letters/characters by which a user/client is required to match by typing and/or matching the string with a response. It is to be understood, because the string is distorted, a machine will be unable to employ optical character recognition techniques (OCR) to decipher the characters in order to automatically respond to the challenge. For instance, the HIP can be a 'challenge' to a client within the data communication 104 to respond to a question, to reproduce a distorted string of characters, to enter a password, etc. Additionally, the HIP can request a biometric input including but, not limited to a fingerprint scan, a retinal scan, a facial scan, a spoken word, a voice sample, inductance specific to an individual, or the like. Thus, any challenge/response mechanism related to a human interaction proof can be used in accordance with aspects of the innovation.

The verification component 102 can employ a performance component 206 that can provide an action to the data communication and/or client based at least in part upon the client HIP response. The performance component 206 can receive a portion of a client HIP response in order to provide an action such as, but not limited to, a termination of the data communication 104, a notification to the client, a notification to the client that initiated the HIP, a warning to the client, a blocking of the client, an addition of the client to a spam/phishing list, a continuation of the data communication, a denial of the data communication, a blocking of the data communication, a validation of the client, a validation of the data communication, a notification to a conference leader, a notification to a failed HIP response client, a notification, a validation, and/or a denial. In general, it is to be appreciated that the performance component 206 can provide any suitable action related to a client and/or a data communication, wherein the action can correlate to the HIP response (e.g., correct, incorrect, suspicious, etc.). It is to be understood that a suspicious and/or malicious behavior can be associated with a bot, spam, automated program, real time application, phishing attack, etc.

In general, the subject innovation can employ a human interaction proof (HIP) to verify identity associated with real time data communications such as, but not limited to, audio data communications, VoIP communications, instant messaging data communications, video data communications, conferencing data communications, application sharing data communications, and/or desktop data communications. The system 200 can verify that a user joining a communication and/or conversation is a human being using several different prompt mechanisms during a real time data communication. For example, the mechanism can be a HIP, wherein a picture with an obfuscated number or a string can be added in which a remote user would have to type the same number or string in response to verify identity. Moreover, incoming calls from potential bots can include hints to the receiver, wherein the system 200 can interject a HIP based at least in part upon the detection of such hint and/or suspicion of bot activity.

The system 200 can monitor the real time communication in real time and provide hints about the identity of the other end in the middle of the communication. For instance, a conference leader can get a hint in the middle of a conference that one of the participants may be a bot in which a HIP can be utilized. It is to be appreciated that a conference leader can initiate a conference that requires a HIP for the participants and/or invitees. In another example, the user initiating an instant messaging communication can get the hint in the middle of a session that the remote endpoint could be a bot in which a HIP can be utilized to verify identity. Still further, a server (not shown) can monitor other conversations to detect and/or collect bot patterns and/or techniques, and send such hints to clients about the potential bot threat. It is to be further appreciated that the implementation of the HIP can be manual, automatic, and/or any combination thereof, wherein the HIP can be utilized to verify the identity of a participant in a conference data communication and/or any other suitable real time data communication (e.g., instant message, audio, video, application sharing, desktop sharing, etc.).

The system 200 can further validate audio communications and/or conversations. The first new conversation with someone can store a voice signature of the remote user, wherein conversations can be validated with this voice signature (e.g., an example HIP). Thus, subsequent conversations can be matched to the voice signature that is stored. The voice signature can be updated automatically when a new conversation and/or communication is created. The HIP can be further employed with real time actions and/or communications such as file sharing or desktop sharing. For instance, a HIP can be automatically invoked upon the detection of a file share or a desktop share. In another example, the system 200 can synchronize potentially unsafe URLs from a server (e.g., an email server, etc.) or client application (e.g., an email application, etc.) to block conversations with potentially unsafe people/clients.

Figure 3:
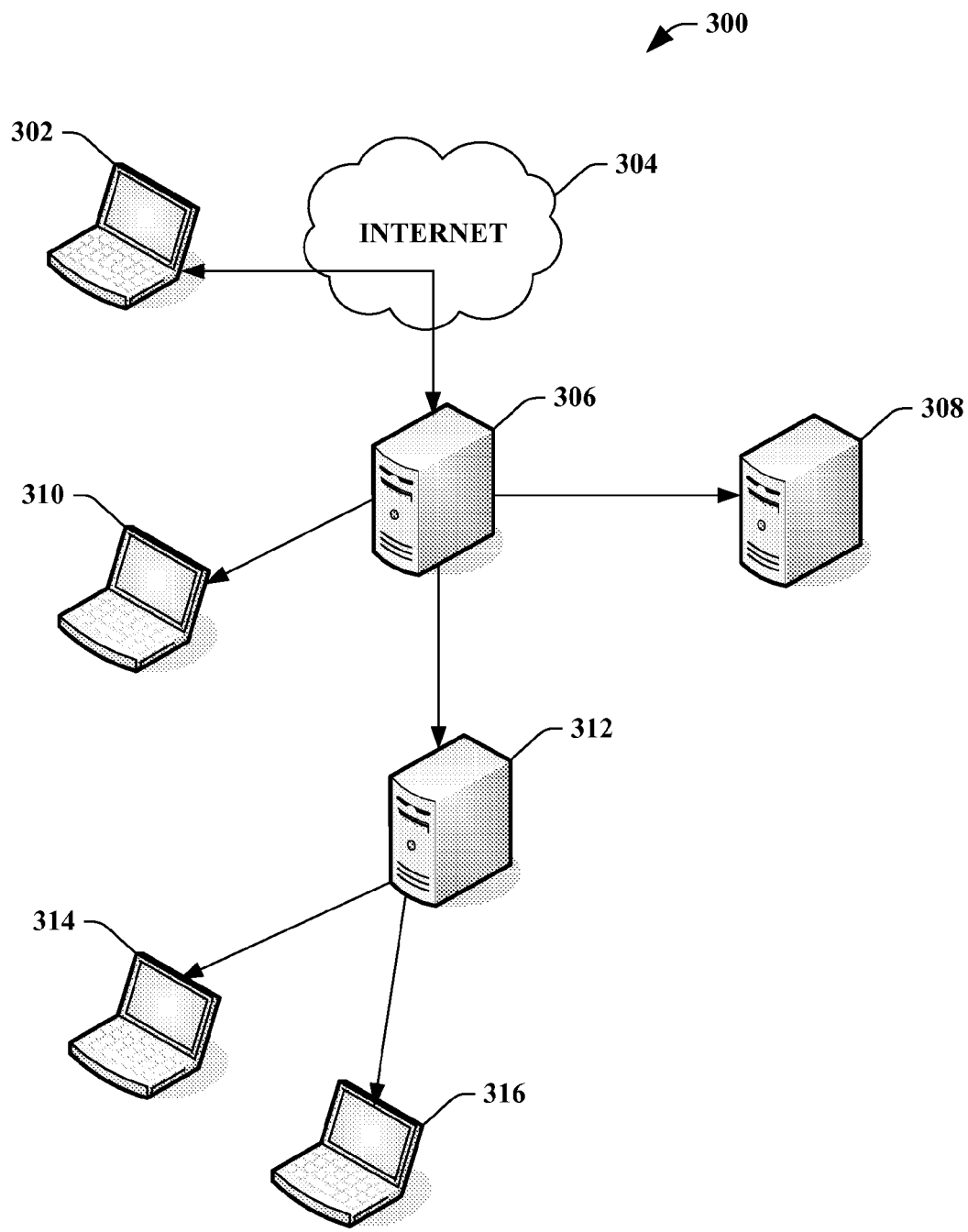
FIG. 3 illustrates a block diagram of an exemplary system that facilitates generating a human interaction proof (HIP) to verify integrity associated with real time communications.

FIG. 3 illustrates a system 300 that facilitates generating a human interaction proof (HIP) to verify integrity associated with real time communications. The system 300 provides an example diagram that specifies various points at which the verification component (not shown) can employ a human interaction proof (HIP) to generate and/or verify. Moreover, the system 300 can include various areas where an existing real time conversation can be monitored by the detection component (not shown). Although not shown, it is to be appreciated and understood that the verification component and the detection component can be utilized with the system 300 as stand alone components, incorporated into a device and/or component illustrated, and/or any combination thereof. For instance, the verification component can be hosted into each client and the detection component can be incorporated into a server. In another example, the verification component and the detection component can be hosted within a server. In still another example, the verification component and the detection component can be stand alone components.

A malicious entity (e.g., a bot, an automated caller, a phishing attack, a real time program, an automated agent in a cloud, etc.) 302 can communicate with a server 306 via the Internet 304. The server 306 can monitor existing conversations and/or communications. In addition, the server 306 can include a list of unsafe locations, unsafe clients, unsafe URLs, etc., wherein the server 306 can prevent routing to such unsafe entities that might be suspect. The server 306 can further receive a junk URL list from an email server 308. The email server 308 can include a data source about malicious URLs or potential phishing sources that can be utilized to inform the server 306 before routing outside a firewall.

The server 306 can further communicate with a caller 310 (e.g., initiator of a data communication). The caller 310 (e.g., a client) can monitor conversations and generate a human interaction proof (HIP) such as an image with numbers, etc. The caller 310 can also synchronize with phishing mail lists and/or junk mail lists with other devices, components, etc. such as the email server 308. The server 306 can also direct a communication to a multipoint conferencing unit 312, wherein such conference can include a conference leader 314 and a conference participant 316. The multipoint conferencing unit 312 can monitor voice and instant messaging activity to detect whether a participant is a bot. In a conference scenario, bot detection by the multipoint conferencing unit 312 can provide more accurate results since the clients do not have direct communication with endpoints.

Figure 4:
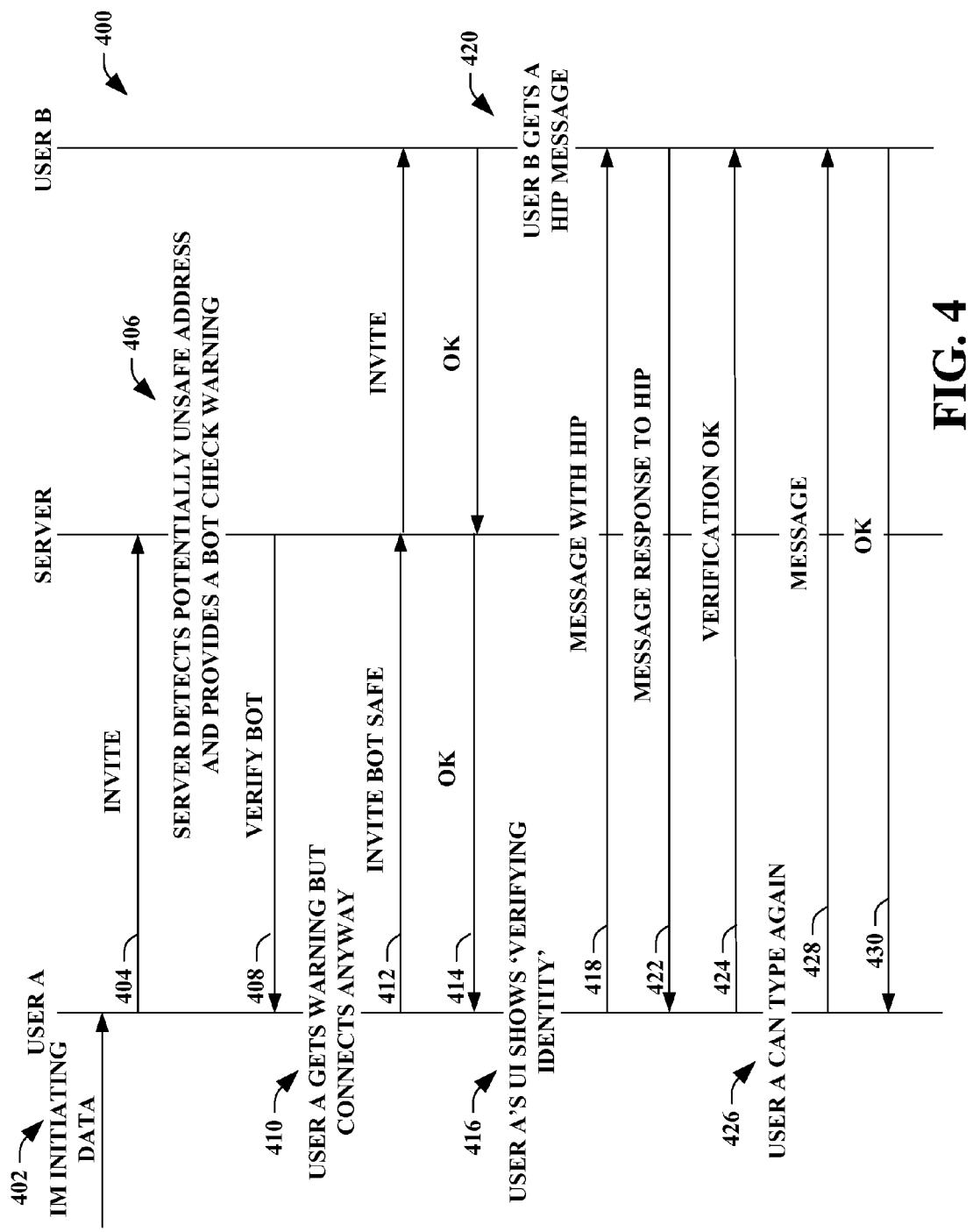
FIG. 4 illustrates a block diagram of an exemplary timing diagram that facilitates validating a human interaction proof (HIP) utilizing session initiation protocol (SIP) for a signaling mechanism.

FIG. 4 illustrates a system 400 that facilitates validating a human interaction proof (HIP) utilizing session initiation protocol (SIP) for a signaling mechanism. It is to be appreciated that the timing diagram 400 is just one illustration in accordance with the subject innovation and is not to be limiting on the claimed subject matter. The timing diagram 400 can illustrate real time communication interaction between user A and user B via a server. At reference numeral 402, an instant messaging (IM) data can be initiated by user A to user B. In general, it is to be appreciated that any real time data communication can be initiated and utilized in connection with the timing diagram 400. This data communication initiation can be transmitted as an invite at reference numeral 404 to the server. At reference numeral 406, the server can detect a potentially unsafe address and provide a bot check warning to user A. At reference numeral 408 a verify bot prompt can be employed. At reference numeral 410, user A can receive a warning but connect anyway to communicate with user B. At reference numeral 412, an invite can be transmitted to user B with the notion that the bot is identified as safe. At reference numeral 414, an OK response is transmitted which opens up the real time data communication.

Continuing at reference numeral 416, user A's user interface (UI) can display a "verifying identity" upon a manual command (e.g., user initiated bot check, etc.), automatic command (e.g., automatically detects suspicious activity, etc.), and/or any combination thereof. At reference numeral 418 a message with a human interaction proof (HIP) can be communicated to user B. At reference numeral 420, user B can receive a message with the HIP. At reference numeral 422, a response to the message with the HIP can be received from user B. At reference numeral 424, verification can be employed for the response (e.g., evaluate to identify whether the response is a correct response to the HIP, etc.). In this example, an OK response is transmitted based on a correct response to the HIP message at reference numeral 424. At reference numeral 426, user A can type again (e.g., continue with the real time data communication since the bot check and/or HIP has been correctly fulfilled, etc.). At reference numeral 428, user A can initiate a message (e.g., real time data communication, instant message, etc.) to user B. At reference numeral 430, user B can provide an OK response to such message.

FIG. 5 illustrates a user interface 500 and a user interface 502, wherein both user interfaces facilitate implementing a human interaction proof in connection with a real time data communication for identity authentication. It is to be appreciated that the user interface 500 and user interface 502 depicted are examples and the subject innovation is not to be so limited. In addition, it is to be appreciated that there are a plurality of nuances and/or subtleties that can be employed in connection with the user interface 500 and user interface 502, thus any such changes are to be considered within the scope of the claimed subject matter. The user interface 502 can be employed in connection with real time communications, and in particular an instant messaging data communication. The user interface 500 can be a communication window with any suitable number of users participating in a real time data communication. The user interface 500 illustrates a real time data communication between two users, Rajesh Ramanathan and Craig Combel. The user interface 500 illustrates a HIP being communicated to Rajesh from Craig, in which Rajesh must correctly type and/or enter in the distorted text/characters to verify identify (e.g., authenticate the user is a human, etc.). Thus, Rajesh must correctly enter L2NX359A for a correct response to the HIP. It is to be appreciated that the characters are distorted in order to thwart computer/machine character recognition programs/applications.

The user interface 502 can be representative of a conference real time data communication. It is to be appreciated that any suitable number of participants can partake in the real time data communication conference. However, for simplicity, the user interface 502 illustrates four (4) participants including the leader Rajesh Ramanathan. The user interface 502 can inform the conference leader of the participants who have passed and/or who have not passed the HIP verification. In this example, the user interface 502 informs the conference leader that Craig Combel cannot be invited and/or join the conference real time data communication based upon the verification of Craig's human identity failed (e.g., a bot or an automated attendant answered). In other words, Craig's response to the HIP was incorrect. It is to be appreciated that the HIP can be employed at any point for a real time data communication (e.g., at initiating of the real time data communication, during the real time data communication, etc.).

Figure 6:
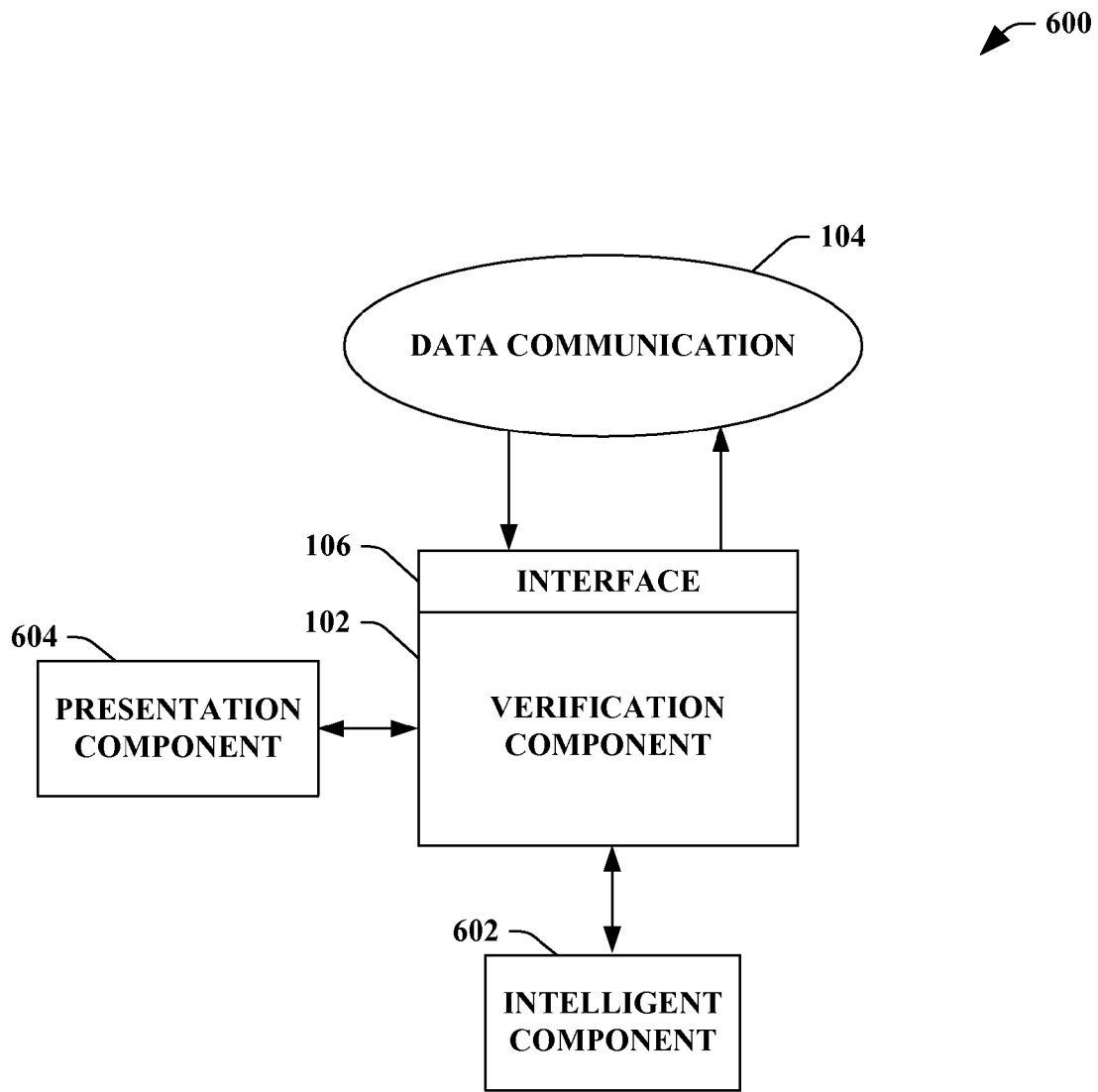
FIG. 6 illustrates a block diagram of an exemplary system that facilitates generating a human interaction proof (HIP) to verify integrity associated with real time communications.

FIG. 6 illustrates a system 600 that employs intelligence to facilitate generating a human interaction proof (HIP) to verify integrity associated with real time communications. The system 600 can include the verification component 102, the data communication 104, and the interface 106. It is to be appreciated that the verification component 102, the data communication 104, and the interface 106 can be substantially similar to respective components, communications, and interfaces described in previous figures. The system 600 further includes an intelligent component 602. The intelligent component 602 can be utilized by the verification component 102 to facilitate generating, communicating, and/or evaluating a human interaction proof (HIP) in order to authenticate identity in a real time data communication. For example, the intelligent component 602 can infer a type of HIP to employ, a kind of HIP to generate, bot detection, activity related to bot and/or automated program response in a real time data communication, actions associated with a HIP response (e.g., block, warn, suspend, etc.), characteristics corresponding to a bot and/or an automated agent, user preferences for HIP implementation, optimal period for HIP employment in a real time data communication, conference leader verification settings, URL detection, server and/or email block list applicability, bot common patterns, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The verification component 102 can further utilize a presentation component 604 that provides various types of user interfaces to facilitate interaction between a user and any component coupled to the verification component 102. As depicted, the presentation component 604 is a separate entity that can be utilized with the verification component 102. However, it is to be appreciated that the presentation component 604 and/or similar view components can be incorporated into the verification component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the verification component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
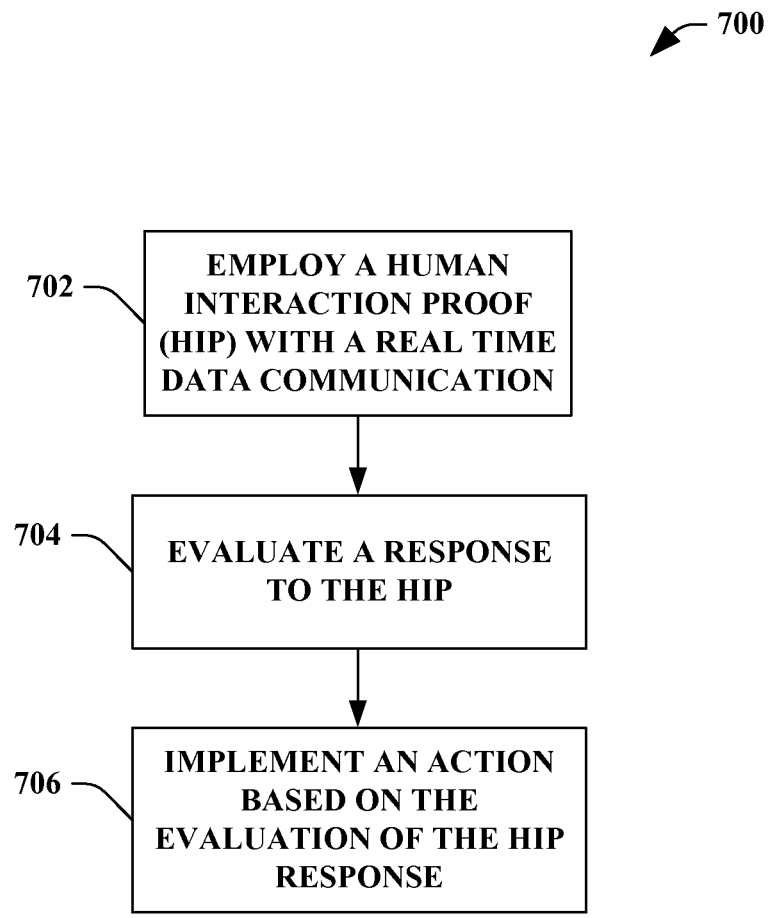
FIG. 7 illustrates an exemplary methodology for securing and authenticating real time communications.
Figure 8:
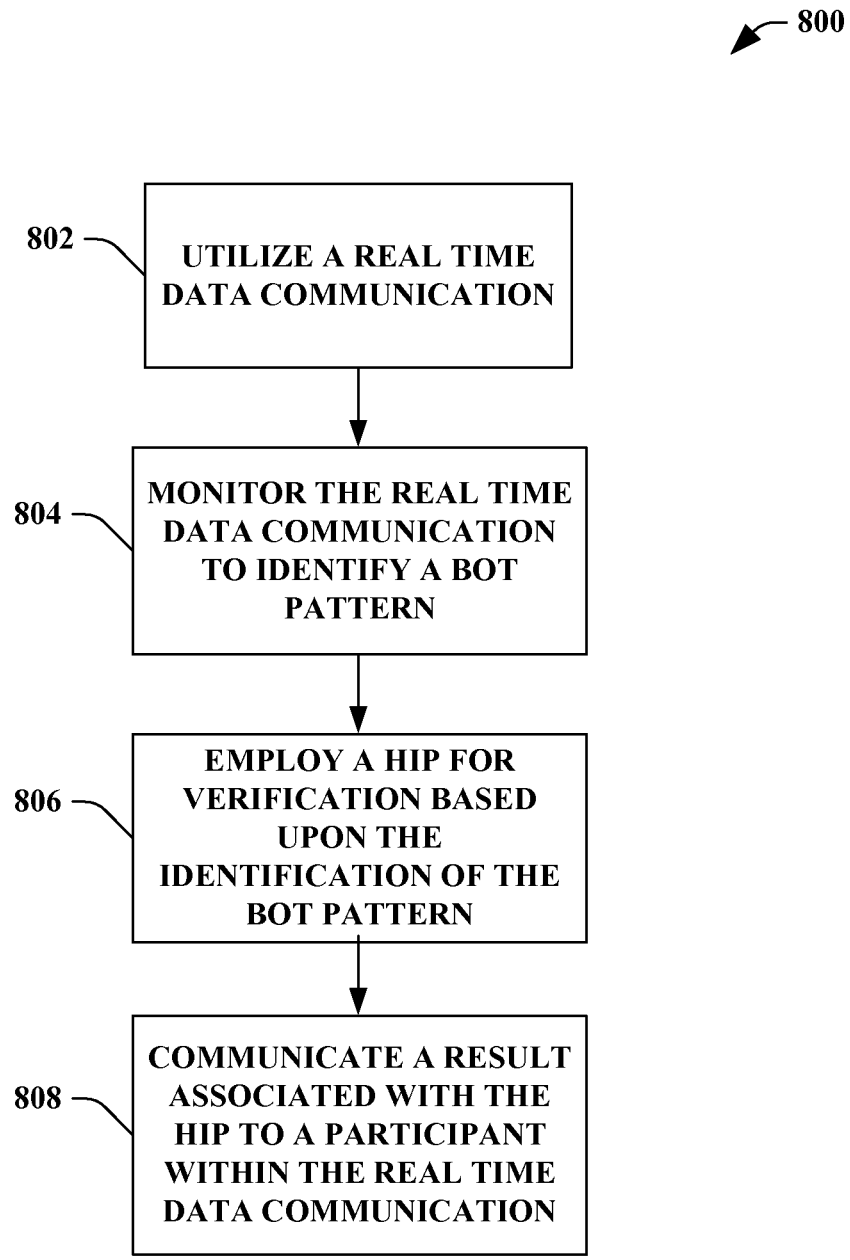
FIG. 8 illustrates an exemplary methodology that facilitates employing a human interaction proof (HIP) to authenticate a data communication associated with real time communications.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates securing and authenticating real time communications. The method 700 can employ a human interaction proof (HIP) in order to authenticate identity within a real time data communication. At reference numeral 702, a human interaction proof (HIP) can be employed with a real time data communication. For example, the real time data communication can be, but is not limited to, an instant messaging communication, a voice communication, an audio communication, a voice over Internet protocol (VoIP) communication, file sharing communication, desktop sharing communication, conference communication, and the like.

Moreover, the human interaction proof (HIP) can be utilized with the real time data communication for identity authentication. For example, the HIP can be any suitable 'challenge' communicated to a client within the real time data communication, wherein such challenge can verify the client as a human being. It is to be appreciated that the HIP can be any suitable human interaction proof such as an image, a portion of characters, a portion of audio data, a portion of voice data, a portion of video data, a distorted string of data (e.g., so a machine will be unable to employ optical character recognition techniques (OCR) to decipher the data), a specifically tailored question, a password request, a biometric input (e.g., a fingerprint scan, a retinal scan, a facial scan, a spoken word, a voice sample, inductance specific to an individual, etc.), and/or any other suitable challenge to a client that can identify a bot and/or automated program.

At reference numeral 704, a response to the HIP can be evaluated. Thus, a participant and/or client within the real time data communication can be presented with a HIP and provide a response thereto. Such response can be evaluated to identify whether a valid or invalid response is provided. For example, if a string of distorted characters is provided as a HIP to a client within an instant messaging communication, the client may provide a response in order to continue the instant messaging communication. Such response can be valid (e.g., matching the string of distorted characters) or invalid (e.g., incorrectly matching the string of distorted characters). At reference numeral 706, an action can be implemented based at least in part upon the evaluation of the HIP response. The action can be related to whether the HIP response is valid or invalid. For example, the action can be to issue a warning, a re-issue of the HIP, a suspension of the real time data communication, a block of the client and/or URL associated with the real time data communication, a notification to a participant within the real time data communication, an addition of the client and/or URL to a spam/bot list, a continuation of the real time data communication, a denial of the real time data communication, a blocking of the data communication, a validation of the client, a validation of the data communication, a notification to a conference leader, a notification to a failed HIP response client, a notification, a validation, and/or a denial.

FIG. 8 illustrates a method 800 for employing a human interaction proof (HIP) to authenticate a data communication associated with real time communications. At reference numeral 802, a real time data communication can be utilized. For example, a real time data communication can be utilized between two or more clients for communications. It is to be appreciated that the real time data communication can be, but is not limited to, an instant messaging communication, a voice communication, an audio communication, a voice over Internet protocol (VoIP) communication, file sharing communication, desktop sharing communication, conference communication, and/or any suitable real time data communication.

At reference numeral 804, the real time data communication can be monitored to identify a bot pattern. For example, the real time data communication can be dynamically monitored in order to ascertain a hint and/or characteristic associated with a bot, an automated program, a phishing attack, an automated agent in a cloud, a real time application, etc. At reference numeral 806, a human interaction proof (HIP) can be employed based upon the identification of the bot pattern. In other words, a HIP can be implemented to a real time data communication upon the detection of a hint and/or characteristic associated with a bot, an automated program, a phishing attack, an automated agent in a cloud, a real time application, etc. At reference numeral 808, a result associated with HIP can be communicated to a participant of the real time communication. For example, the HIP result can be communicated to a client within the real time data communication, a conference leader, a user monitoring the real time data communication, an administrator, a server, an email server, etc.

Figure 9:
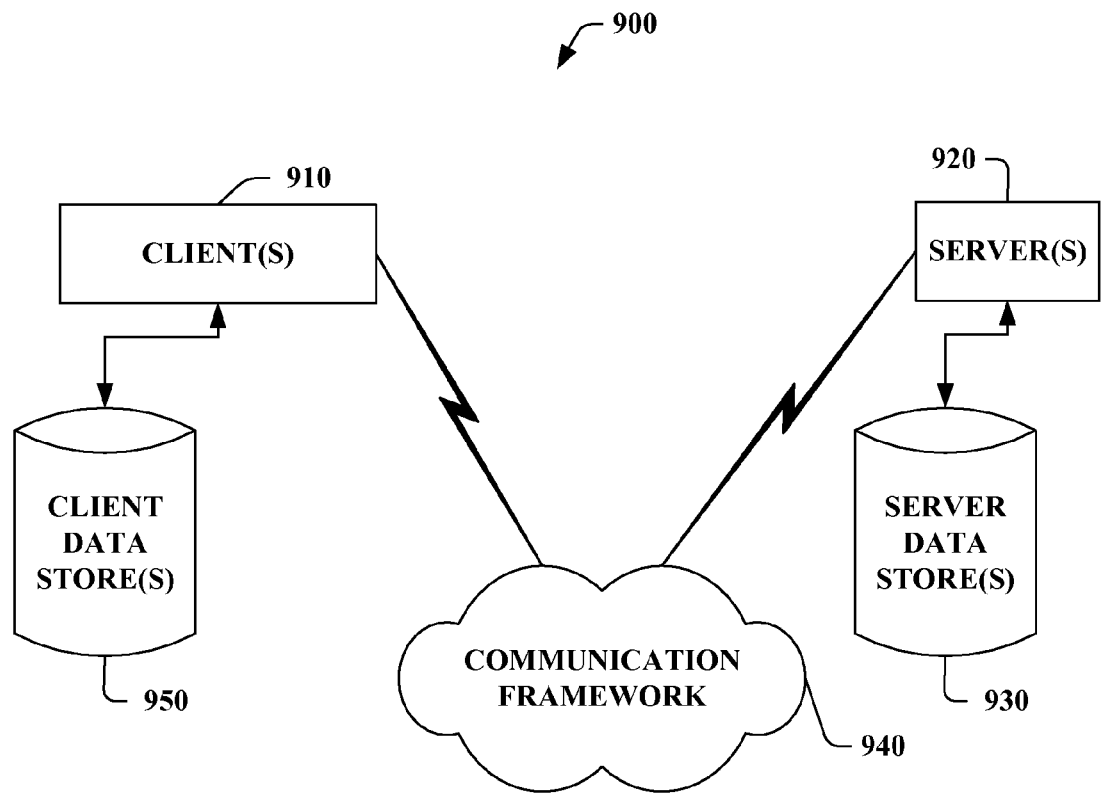
FIG. 9 illustrates an exemplary networking environment, wherein the novel aspects of the claimed subject matter can be employed.
Figure 10:
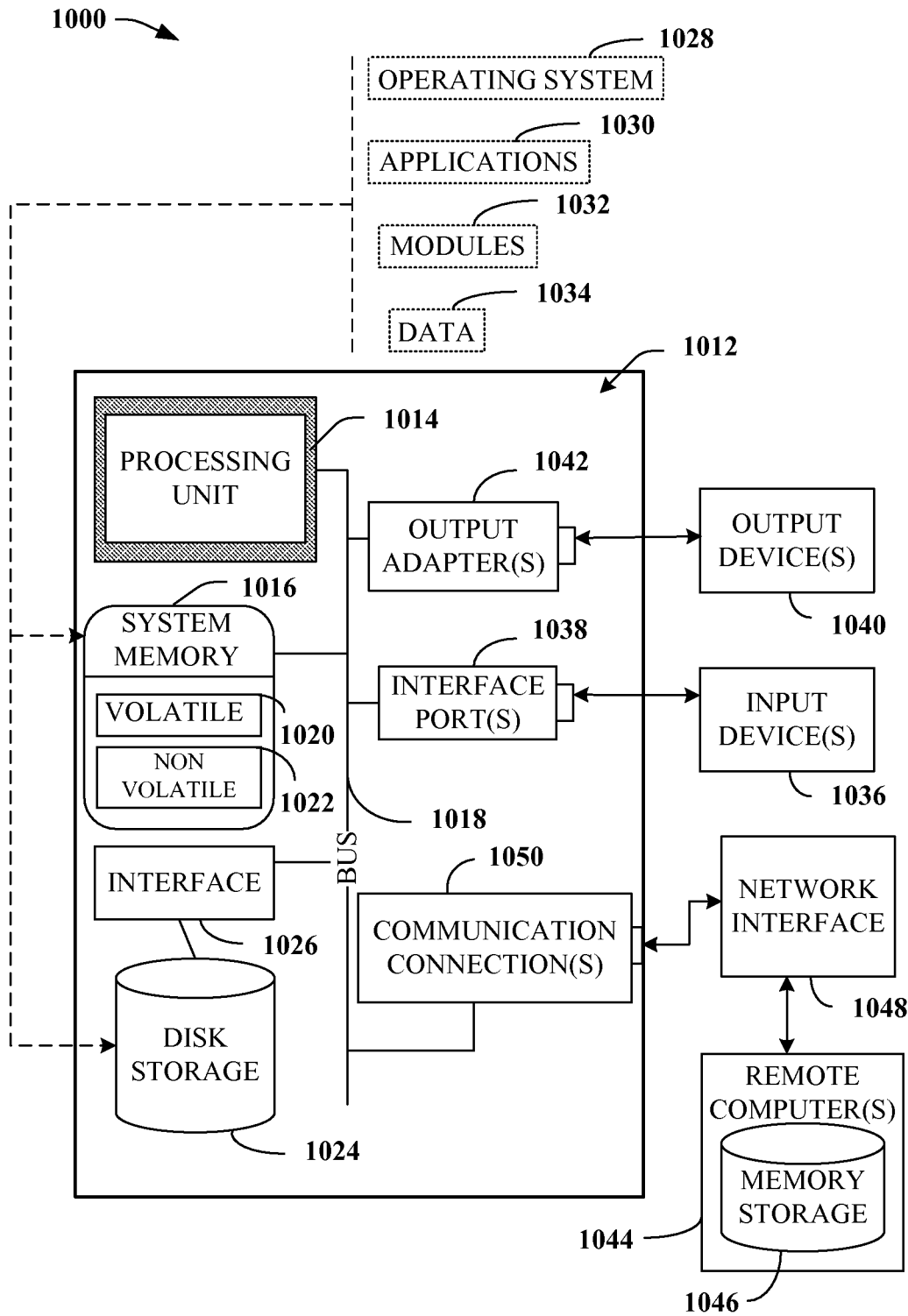
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, a verification component that can authenticate data communication integrity, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system comprising:
    at least one processor configured to execute computer-executable instructions; and
    memory storing computer-executable instructions that, when executed by the at least one processor, implement:
        an interface component configured to receive data related to a real time data communication between two or more clients; and
        a verification component configured to identify a particular client participating within the real time data communication as a potential security threat, communicate a message including a human interaction proof (HIP) to the particular client from a user participating within the real time data communication, authenticate a human identity for the particular client by evaluating a response to the HIP, and communicate a result associated with the HIP to the user, wherein the verification component includes:
            a detection component configured to dynamically monitor the real time data communication in order to identify potential security threats and configured to provide a warning to the user about potential security issues with the particular client, and
            an HIP generator configured to create the HIP to be provided to the particular client during the real time data communication between the two or more clients.

2. The system of claim 1, wherein the real time data communication includes at least one of an instant messaging communication, a voice communication, an audio communication, a voice over Internet protocol (VoIP) communication, a file sharing communication, a desktop sharing communication, or a conference communication.

3. The system of claim 1, wherein the human interaction proof includes at least one of an image, a portion of characters, a portion of audio data, a portion of voice data, a portion of video data, a distorted string of text, a question, a password request, a biometric input a fingerprint scan, a retinal scan, a facial scan, a spoken word, a voice sample, a digital signature, or an inductance specific to an individual.

4. The system of claim 1, wherein the detection component dynamically monitors the real time data communication for characteristics associated with at least one of a bot, an automated program, a real time application, a phishing attack, an automated application, an automated agent, an automated agent in a cloud, a portion of spam, a phishing uniform resource locator (URL), a user in a public Internet cloud, or a malicious portion of data.

5. The system of claim 1, wherein the real time data communication occurs in a first communication mode, the HIP generator creates the HIP for the first communication mode, and the HIP generator is further configured to create a disparate HIP for another communication mode different from the first communication mode.

6. The system of claim 1, wherein the detection component is configured to employ a pattern matching heuristic based on previous conversations to identify malicious data communications.

7. The system of claim 1, wherein the detection component warns the user that the particular client is a bot or a malicious user.

8. The system of claim 1, wherein the response to the HIP must include human input in order to authenticate the human identity for the particular client.

9. The system of claim 1, wherein the HIP generator is configured to create the HIP based upon one or more of:
    a type of the real time data communication; or
    a type of the particular client participating in the real time data communication.

10. The system of claim 1, further comprising a performance component configured to implement an action relating to the real time data communication based upon the response to the HIP.

11. The system of claim 10, wherein the action based upon an invalid response to the HIP includes at least one of issuing a warning to the particular client, a re-issue of the HIP to the particular client, a suspension of the real time data communication, a block of the particular client, a block of a URL associated with the real time data communication, a termination of the real time data communication, or an addition of the particular client to a spam/bot list.

12. The system of claim 10, wherein the action based upon a valid response to the HIP includes at least one of a continuation of the real time data communication, a validation of the particular client, or a validation of the real time data communication.

13. The system of claim 1, wherein the verification component is configured to utilize authentication of the particular client for instant messaging communication to authenticate the particular client for audio data communication.

14. The system of claim 1, wherein the real time data communication occurs within a conference session, and the verification component is configured to identify a joining participant as a potential security threat based on silence of the joining participant during the conference session.

15. The system of claim 1, wherein the verification component communicates the message including the HIP to the particular client during the real time data communication based upon a manual command from the user to initiate a bot check.

16. The system of claim 1, wherein the verification component is configured to automatically invoke the HIP based upon at least one of an identification of a bot pattern, a file sharing, a desktop sharing, a pre-defined time of silence, or a phishing attack.

17. A computer-implemented method comprising:
    monitoring a real time data communication between two or more clients in order to identify potential security threats;
    identifying a particular client participating within the real time data communication as a potential security threat;
    providing, to a user participating within the real time data communication, a warning about potential security issues with the particular client;
    creating a human interaction proof (HIP) to be provided to the particular client during the real time data communication;
    communicating a message including the HIP to the particular client from the user participating within the real time data communication;
    authenticating a human identity for the particular client by evaluating a response to the HIP provided by the particular client; and
    communicating a result associated with the HIP to the user participating within the real time data communication.

18. The method of claim 17, wherein the real time data communication includes at least one of an instant messaging communication, a voice communication, an audio communication, a voice over Internet protocol (VoIP) communication, a file sharing communication, a desktop sharing communication, or a conference communication.

19. The method of claim 17, further comprising:
    identifying a bot pattern; and
    sending a hint about a potential bot threat to the user participating within the real time data communication.

20. A computer-readable storage device storing computer-executable instructions that, when executed by a computing device, cause the computing device to perform operations comprising:
    monitoring a real time data communication between two or more clients in order to identify potential security threats;
    identifying a particular client participating within the real time data communication as a potential security threat;
    providing, to a user participating within the real time data communication, a warning about potential security issues with the particular client;
    creating a human interaction proof (HIP) to be provided to the particular client during the real time data communication;
    communicating a message including the HIP to the particular client from the user participating within the real time data communication;
    authenticating a human identity for the particular client by evaluating a response to the HIP provided by the particular client; and
    communicating a result associated with the HIP to the user participating within the real time data communication.

* * * * *